United States Patent
Wybrow

(10) Patent No.: US 8,061,253 B2
(45) Date of Patent: Nov. 22, 2011

(54) COMPOSITE SPARS

(75) Inventor: Tim Wybrow, Worcestershire (GB)

(73) Assignee: GE Aviation Systems Limited (GB)

( * ) Notice: Subject to any disclaimer, the term of this patent is extended or adjusted under 35 U.S.C. 154(b) by 44 days.

(21) Appl. No.: 12/632,893

(22) Filed: Dec. 8, 2009

(65) Prior Publication Data

US 2010/0170990 A1     Jul. 8, 2010

(30) Foreign Application Priority Data

Jan. 7, 2009   (GB) .................................. 0900115.7

(51) Int. Cl.
*D04C 1/06*     (2006.01)

(52) U.S. Cl. ..................................... 87/13; 87/34; 87/62

(58) Field of Classification Search .................... 87/8, 9, 87/13, 34, 62; 428/36.3
See application file for complete search history.

(56) References Cited

U.S. PATENT DOCUMENTS

| | | | |
|---|---|---|---|
| 3,583,275 A * | 6/1971 | Duflos ............................. | 87/57 |
| 4,519,290 A * | 5/1985 | Inman et al. ....................... | 87/7 |
| 4,789,304 A | 12/1988 | Gustafson et al. | |
| 5,203,249 A * | 4/1993 | Adams et al. ..................... | 87/34 |
| 5,222,297 A | 6/1993 | Graff et al. | |
| 5,269,658 A | 12/1993 | Carlson et al. | |
| 6,503,625 B1 | 1/2003 | Rieder et al. | |
| 7,093,527 B2 * | 8/2006 | Rapaport et al. .................. | 87/34 |
| 2004/0237760 A1 * | 12/2004 | Shimizu ............................ | 87/34 |
| 2006/0070516 A1 * | 4/2006 | McCullagh et al. ............... | 87/9 |
| 2008/0206048 A1 | 8/2008 | Coupe et al. | |

FOREIGN PATENT DOCUMENTS

| | | |
|---|---|---|
| CA | 401686 A | 12/1941 |
| GB | 2084507 A | 4/1982 |
| GB | 2237532 A | 8/1991 |
| GB | 2443482 A | 7/2008 |
| JP | 2002240159 A | 2/2001 |
| WO | 99/61385 A2 | 12/1999 |
| WO | 0041523 A2 | 7/2000 |
| WO | 2008087443 A1 | 7/2008 |

OTHER PUBLICATIONS

Combined Search and Examination Report in GB Application No. 0900115.7 dated May 11, 2009.

* cited by examiner

*Primary Examiner* — Shaun R Hurley
(74) *Attorney, Agent, or Firm* — Global Patent Operation; Jonathan E. Thomas

(57) ABSTRACT

According to one aspect, the present invention relates to a method of manufacturing at least one non-uniform thickness composite spar component. The method comprises braiding a plurality of fibers over a non-cylindrical mandrel to form a variable thickness shaped fiber preform, flattening the shaped fiber preform and cutting the flattened shaped fiber preform to obtain the at least one non-uniform thickness composite spar component. Spars made according to various embodiments of the present invention are faster and less expensive to manufacture than conventional composite spar components.

7 Claims, 3 Drawing Sheets

Increasing ply thickness

COMPOSITE SPARS

FIELD OF INVENTION

The present invention relates generally to composite spars. More particularly, the present invention relates to composite spars of varying thickness, for example, for use in various aviation applications such as for propeller spars, wing spars, etc.

BACKGROUND OF THE INVENTION

A spar is an integral component of many products. Such spars are generally load bearing structural elements used to add support to such products. For example, wing spars are provided in aircraft for fixing the wings to the aircraft and for transmitting lift generated by the wings to the fuselage of the aircraft.

It is known that spars are often formed using metal materials provided either as a solid or in a framework structure. For example, various metal spars are known for use in propeller blades [1-5] to provide structural support to airfoils that are formed thereabouts.

However, spars are sometimes now manufactured using composite materials (e.g. by using woven or braided materials of various fibres such as glass and/or carbon, etc.) because such composite materials [6-8] are generally lighter and stiffer than conventional metallic spars.

Nevertheless, whilst conventional composite material based spars are better for many applications they are not ideal, for example, where there is a need to form complex shapes with varying thicknesses, like for wing/propeller spars, etc.

Hence, to address the need to form complex spar shapes using composite materials, various manufacturing techniques have been adopted.

For example, when manufacturing a spar for a propeller it is known to use a ply-drop technique in which shaped portions of cut sheet cloth material are laid-up by hand in order to produce a stepped-edged approximation to an ideal three-dimensional shape of a spar. The stepped edge spar is then over-braided with composite fibre materials before being infused with resin to provide a finished airfoil-shaped propeller.

Although such a technique provides good quality propellers, there are certain disadvantages associated with such a manufacturing technique. For example, the cloth/fabric material is expensive and has to be quality inspected before it can be used, additionally the technique relies heavily on the skill and experience of an operator to correctly assemble the layers into the multi-layered stepped spar component. This also further slows the manufacturing process and makes production relatively expensive.

Additionally, the strength of the finished airfoil depends upon the adhesion of the individual shaped portions to one another in order to ensure that the individual layers forming the spar do not delaminate when in use. Furthermore, the stepped edge portions of the individual layers, or ply-drops, can introduce gaps between the multi-layered spar and the overlying braided skin where pockets of resin are prone to build-up in the finished propeller. These resin pockets can in turn create wrinkles in the spar of the propeller blade, in conjunction with braided fibre misalignment, causing subsequent possible creation of stress points where fractures in the structure may initiate.

It would therefore be desirable to provide an improved way of producing composite spars, particularly those having a varying thickness.

SUMMARY OF THE INVENTION

Various aspects and embodiments of the present invention have thus been devised whilst bearing the above-mentioned drawbacks associated with conventional spars and their associated manufacturing techniques in mind.

According to a first aspect of the present invention, there is provided a method of manufacturing at least one non-uniform thickness composite spar component. The method comprises braiding a plurality of fibres over a non-cylindrical mandrel to form a variable thickness shaped fibre preform, flattening the shaped fibre preform and cutting the flattened shaped fibre preform to obtain at least one non-uniform thickness composite spar component.

According to a second aspect of the present invention, there is provided an apparatus for manufacturing a non-uniform thickness composite spar component. The apparatus comprises a braiding machine, a variable position shuttle and a non-cylindrical mandrel. The variable position shuttle is operable to change the relative position of the non-cylindrical mandrel with respect to the braiding machine such that a spar ply is braided about the non-cylindrical mandrel.

According to a further aspect of the present invention, there is provided a non-cylindrical mandrel for use in the apparatus according to the second aspect of the present invention.

Various aspects and embodiments of the present invention enable the manufacture of a variable thickness spar component without the need to use a ply-drop technique. Production is thereby speeded whilst both costs and the number of manufacturing defects are reduced.

BRIEF DESCRIPTION OF THE DRAWINGS

Various aspects and embodiments of the present invention will now be described in connection with the accompanying drawings, in which.

DETAILED DESCRIPTION OF THE INVENTION

Figure 1:
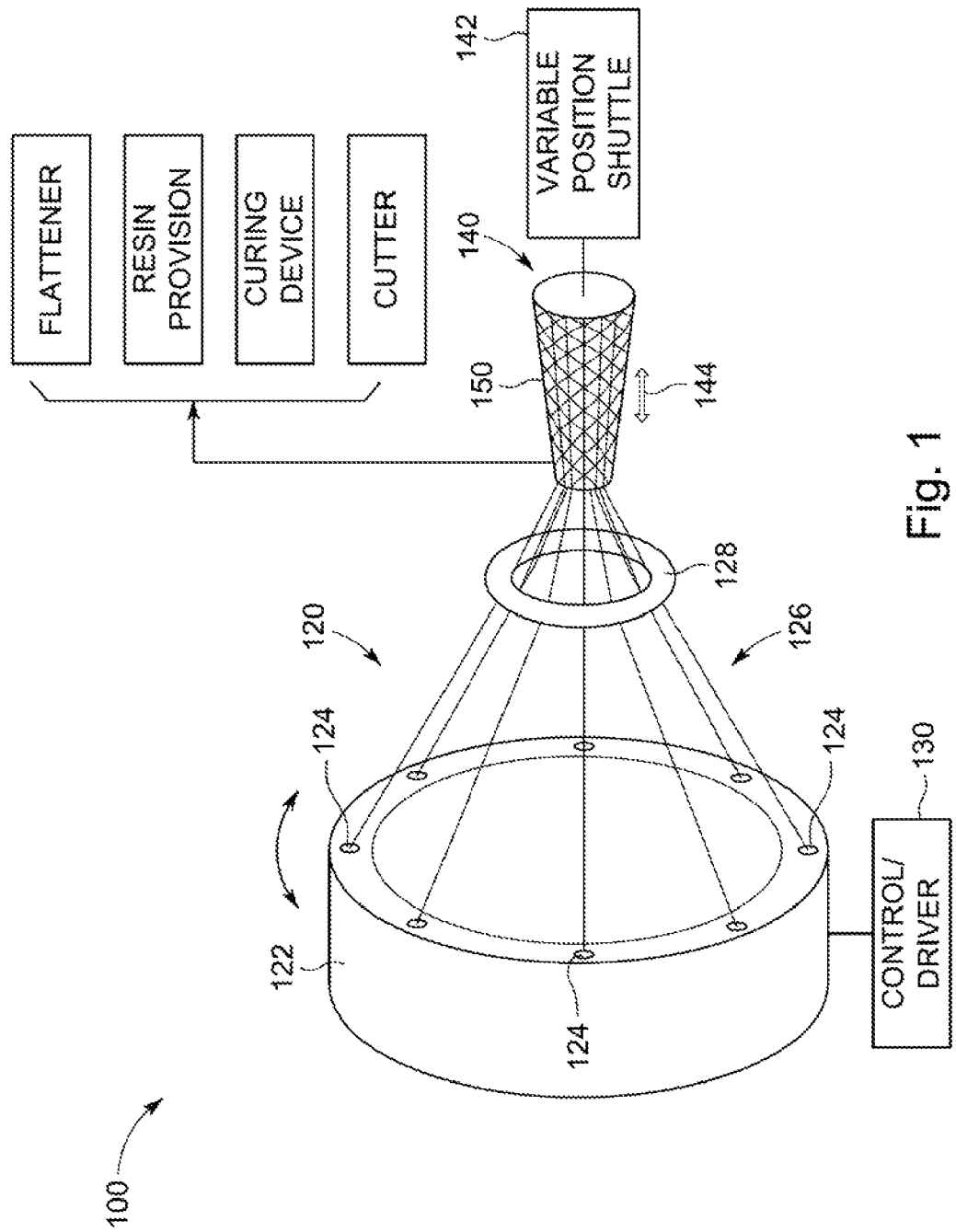
FIG. 1 shows an apparatus for manufacturing a non-uniform thickness composite spar component in accordance with an embodiment of the present invention.

FIG. 1 shows an apparatus 100 for manufacturing a non-uniform thickness composite spar component 152 in accordance with an embodiment of the present invention. The apparatus comprises a braiding machine 120, a variable position shuttle 142 and a non-cylindrical mandrel 140.

The non-cylindrical mandrel 140 may be formed of foam, aluminum, plastics, etc., and may be some 1.3 m in length for forming a propeller blade. In various embodiments, a plurality of mandrels (e.g. up to three) of increasing diameter may be used to produce a spar. The variation in thickness of the spar component 152 may be, for example, from about 10 mm to about 15 or 20 mm, and the finished spar component 152 may have dimensions of approximately 1300 mm×250 mm×9 mm, for example.

In one embodiment, the braiding machine 120 is a Herzog™ RF1/192-100 braiding machine available from Herzog Maschinenfabrik GmbH & Co. KG, Am Alexanderhaus 160, D-26127, Oldenburg, Germany [9].

The braiding machine 120 includes a rotatable drum 122 upon which a plurality of bobbins 124 are mounted. In FIG. 1, only eight such bobbins 124 are shown for clarity reasons. In practice, however, many more such bobbins (e.g. 192) may be provided. In operation, the rotatable drum 122 is driven to rotate about a cylindrical axis 144 by a controller/driver device 130, which may include an electric motor operated under the control of a computerized control system (not shown). The bobbins 124 move independently on carriers in an S-shaped pattern around the circumference of the braided, moving from one carrier to the next.

The bobbins 124 are loaded with various fibres 126 that are braided ultimately to produce non-uniform thickness composite spar component 152. The fibres 126 can include, for example, glass fibres, e-glass, Kevlar™, boron, S-glass, thermoplastics, carbon fibres, etc. The fibres 126 may be made up of a plurality of respective individual strands. In one embodiment, both glass fibres and carbon fibres are provided in a ratio of 4:1. Suitable carbon and glass fibres are commercially available from a variety of manufacturers.

In various embodiments, the fibres 126 are provided as fibre tows made up of thousands of individual filaments. Such individual filaments may be of the order of about 0.005 to about 0.010 mm in diameter. For example, a 3 k, 6 k, 12 k, 24 k, etc. fibre tow may be used. In one embodiment, the fibre 126 is a 12 k HTA type that is relatively flat and has a width from about 3 to about 5 mm.

The fibres 126 are threaded through a braiding guide 128 and temporarily affixed to the non-cylindrical mandrel 140. The non-cylindrical mandrel 140 may be tapered in shape, for example, being shaped like a truncated cone, frustum, etc. The non-cylindrical mandrel 140 is coupled to the variable position shuttle 142, such that when the variable position shuttle 142 is operated the relative position of the non-cylindrical mandrel 140 moves laterally with respect to the braiding machine 120 along the direction of the axis 144. The non-cylindrical mandrel 140 is made of a material that is suitably light and stiff such that it can be supported at each end without bending.

During operation, as the rotatable drum 122 rotates, the non-cylindrical mandrel 140 is moved laterally along the cylindrical axis 144 and the fibres 126 are braided together over the surface of the non-cylindrical mandrel 140 to form a spar ply 150. This process may be repeated by over-braiding one or more additional spar ply layers, for example, whilst moving the non-cylindrical mandrel 140 in an opposite direction.

By moving a non-cylindrical mandrel, for example, at a constant speed along the cylindrical axis 144 whilst depositing fibres 126 also at a constant speed, the spar ply 150 is imparted with a varying thickness along its length in the direction of the cylindrical axis 144 due to the variation in the radial dimensions of the non-cylindrical mandrel. Thus a non-uniform thickness spar ply 150 can be produced simply, and without the need to use a ply-drop, or other similar, technique. Moreover, such a technique is easy to automate without requiring a skilled operator to obtain the desired non-uniformity in the spar ply thickness.

The spar ply might comprise a tri-axial weave in which fibres 126 are disposed at +45°, 0°, and −45° with respect to the cylindrical axis 144 in order to provide optimal torsional strength. For example, carbon fibres might be disposed substantially in parallel with the cylindrical axis 144 (i.e. at an angle of about 0° thereto) to form load-bearing structural elements in a finished non-uniform thickness composite spar component 152, and interwoven with offset glass fibres (e.g. at angles of about +45° and about −45° to the cylindrical axis 144) so as to provide torsional rigidity in the finished non-uniform thickness composite spar component 152. In various embodiments, it is also possible to vary relative braid angles of the fibres to further control the ply thickness.

An apparatus 100 for manufacturing a non-uniform thickness composite spar component 152 may also include various other elements such as rollers, a vacuum pressing system, a press, etc. (not shown) that form a flattener for flattening the spar ply. A resin provision and curing device (not shown) may also be provided for stabilizing the flattened spar ply prior to cutting, and a cutter (not shown) might also be provided for cutting the spar ply. These elements may be provided in order to substantially automate production of non-uniform thickness composite spar components 152.

Figure 2:
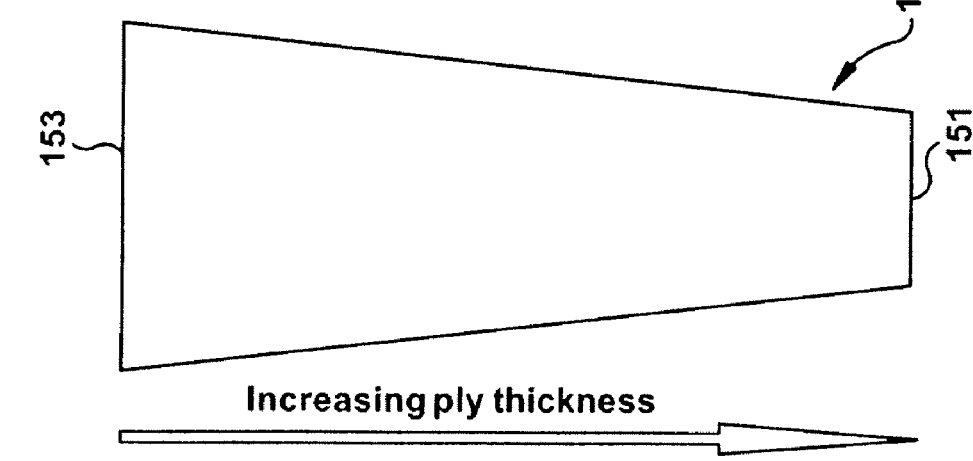
FIG. 2 shows a variable thickness shaped fibre preform in accordance with an embodiment of the present invention.

FIG. 2 shows a variable thickness shaped fibre preform 150 in accordance with an embodiment of the present invention. The variable thickness shaped fibre preform 150 may be manufactured using an apparatus 100 of the type shown in FIG. 1.

The variable thickness shaped fibre preform 150 is made from a spar ply formed in the shape of a conic section. The variable thickness shaped fibre preform 150 decreases in diameter from a first end 153 along a longitudinal axis towards a narrowest region at a second end 151. The thickness of the spar ply increases from the first end 153 to the second end 151. Such an increase may be linear in nature or might be made to conform to various other predetermined thickness profiles (e.g. parabolic, asymptotic, etc.) according to the requirements of a particular desired finished non-uniform thickness composite spar component 152.

The spar ply may be formed by braiding three fibres in a tri-axial weaving pattern. For example, longitudinal fibre tows can be provided extending generally from the first end 153 to the second end 151 with crossed fibre tows inter-braided therewith (e.g. at angles thereto of about ±45°, ±60°, ±70°, or combinations thereof, etc.). Torsional performance of finished spar components can thus be tailored. Additionally, by providing inter-braided fibres, rather than conventional interspersed separate layers, various non-uniform thickness composite spar components provided in accordance with the present invention are provided with improved internal load distribution properties.

Figure 3:
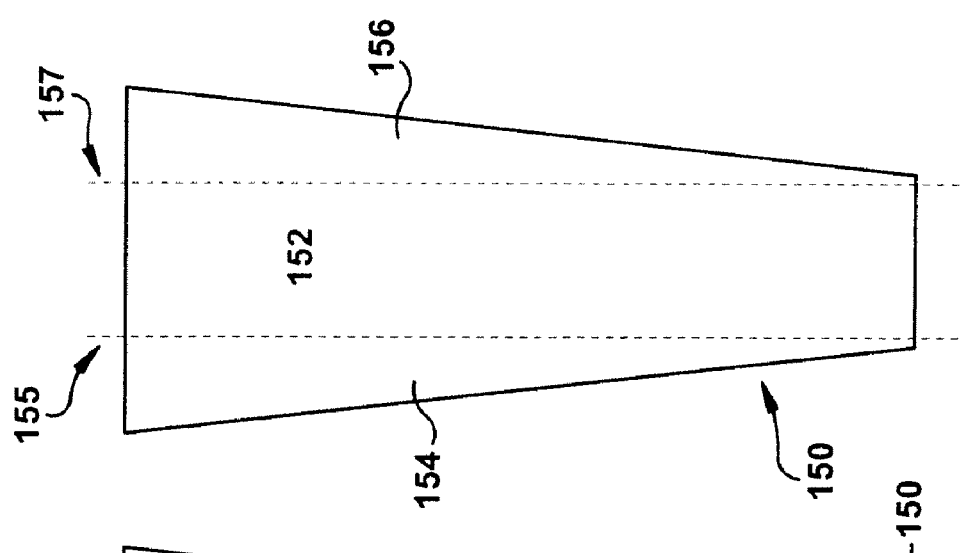
FIG. 3 shows how the variable thickness shaped fibre preform of FIG. 2 may be processed in accordance with a method according to the present invention.

FIG. 3 shows how the variable thickness shaped fibre preform 150 of FIG. 2 may be processed in accordance with a method according to the present invention. The spar ply of the variable thickness shaped fibre preform 150 is flattened.

Optionally, it may be fixed or stabilized before being flattened, for example, by stitching, bonding, etc. In one embodiment, the spar ply is flattened and lateral side portions 154, 156 are bonded by impregnating them with resin and curing the resin to maintain the variable thickness shaped fibre preform 150 in a stable substantially flat position. A central portion, that eventually forms two non-uniform thickness composite spar components 152, is not bonded so that the two opposing spar ply elements can readily be separated. Alternatively, the central portion may be temporarily closed, for example, by stitching the opposite spar ply elements together.

In various embodiments, the fibre 126 may be provided with a binder material on its surface. Typically this is an epoxy or thermoplastic binder agent, which under heat and/or pressure, can be used to consolidate the layers. The preform 150 may then simply be flattened, then gently heated, cooled and then cut. Alternatively, binder materials in sheet form may be manually applied. Another alternative is the use of vacuum to hold the preform in place whilst being cut. This may be done with a perforated table and a vacuum generator.

Once flattened the variable thickness shaped fibre preform 150 is then cut along two cut lines 155, 157. For example, a guillotine type cutter or a computer controlled numerical (CNC) cutting table may be used.

Figure 4:
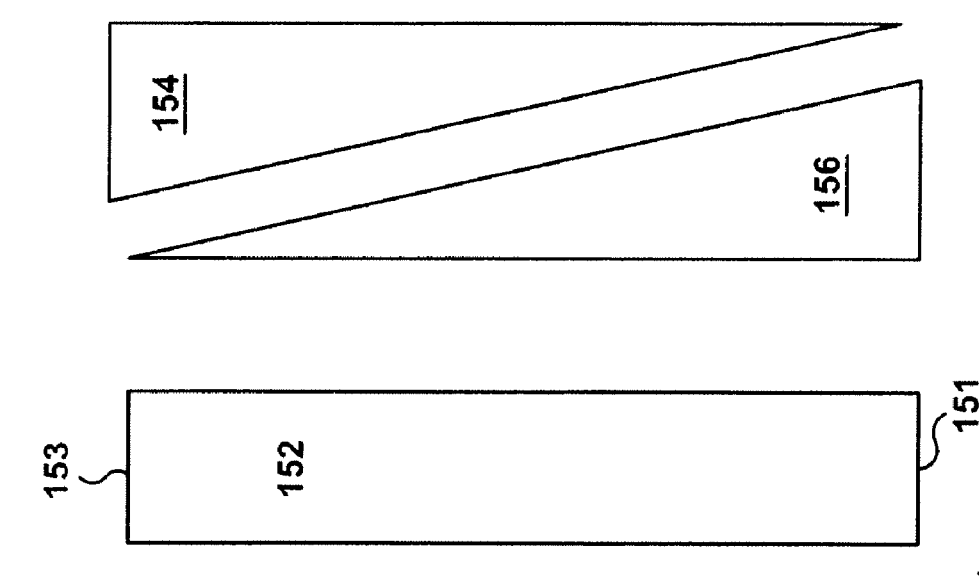
FIG. 4 shows a non-uniform thickness composite spar component and waste off-cut components produced by the processing of FIG. 3 in accordance with an embodiment of the present invention.

FIG. 4 shows a non-uniform thickness composite spar component 152 and waste off-cut components produced by the processing of FIG. 3, in accordance with an embodiment of the present invention. The waste off-cut components are formed from the two processed lateral side portions 154, 156, and may thus be impregnated with cured resin, for example.

The non-uniform thickness composite spar component 152 can be made as a non-interspaced weave, with fibres distributed continuously throughout the body thereof. The non-uniform thickness composite spar component 152 tapers in thickness being thicker towards the first end 153 and thinner towards the second end 151.

Various non-uniform thickness composite spar components 152 may be used in propellers, wings, etc. where it is desirable to have varying thickness along the length of the spar to account for differential loading when in use. For example, a thicker portion towards the second end 151 may be used near a propeller root/inboard connection to a fuselage etc., where an enhanced strength and/or stiffness connection is desired.

Figure 5:
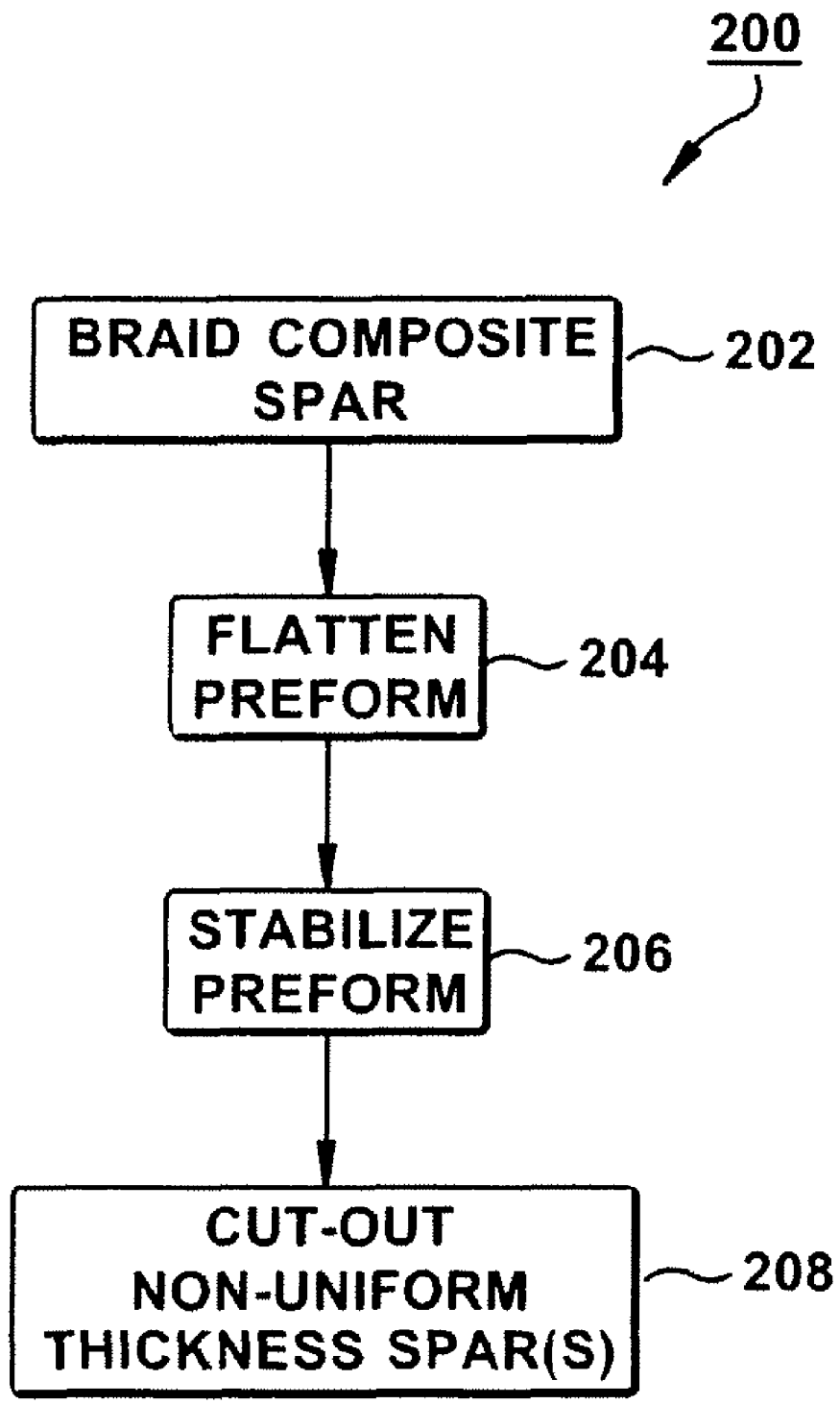
FIG. 5 shows a method of manufacturing at least one non-uniform thickness composite spar component in accordance with an embodiment of the present invention.

FIG. 5 shows a method 200 of manufacturing at least one non-uniform thickness composite spar component in accordance with an embodiment of the present invention.

The method comprises the step of braiding 202 a plurality of fibres over a non-cylindrical mandrel to form a variable thickness shaped fibre preform.

After braiding, the next step is flattening 204 of the shaped fibre preform. Optionally, the flattened preform is then stabilized at step 206.

Finally, the method 200 comprises cutting 208 the flattened, optionally stabilized, shaped fibre preform to obtain the at least one non-uniform thickness composite spar component.

Whilst various aspects and embodiments of the present invention have been described herein, those skilled in the art will be aware that many different embodiments of non-uniform thickness composite spar components with many varied applications may be produced in accordance with techniques falling within the scope of the present invention. For example, the non-cylindrical mandrel may be provided as a shaped foam core that can form an integral part of a finished component, any over-braided fibres therefore not having to be removed from the mandrel and flattened in order to produce a finished product.

REFERENCES

CA 401 686 (Caldwell)
GB 2 084 507 (Nutter)
U.S. Pat. No. 4,789,304 (Gustafson)
GB 2 237 532 (Fecto)
U.S. Pat. No. 5,269,658 (Carlson)
U.S. Pat. No. 5,222,297 (Graff)
GB 2 443 482 (Pentony)
WO 2008/087443 (Bateup)
http://www.herzog-online.com Where permitted, the content of the above-mentioned references are hereby also incorporated into this application by reference in their entirety.

What is claimed is:

1. A method of manufacturing at least one non-uniform thickness composite spar component, the method comprising:
    braiding a plurality of fibres over a non-cylindrical mandrel to form a variable thickness shaped fibre preform;
    flattening the shaped fibre preform; and
    cutting the flattened shaped fibre preform to obtain the at least one non-uniform thickness composite spar component.

2. The method of claim 1, further comprising stabilizing the flattened shaped fibre preform prior to cutting.

3. The method of claim 1, wherein braiding comprises braiding three fibres in a tri-axial weaving pattern.

4. The method of claim 3, comprising braiding the fibres in a 45°-0°-45° arrangement.

5. The method of claim 1, comprising continuously braiding a plurality of layers over one another to increase the average thickness of the variable thickness shaped fibre preform.

6. A non-uniform thickness composite spar component produced in accordance with the method of claim 1.

7. A product incorporating the non-uniform thickness composite spar component of claim 6, wherein the product is a propeller or a wing spar.

\* \* \* \* \*